3,158,590
RESINS FROM EPOXY ACETALS
Benjamin Phillips and Paul S. Starcher, Charleston,
W. Va., assignors to Union Carbide Corporation, a corporation of New York
No Drawing. Filed Jan. 22, 1962, Ser. No. 167,905
25 Claims. (Cl. 260—78.4)

This invention relates to curable epoxide compositions and resins made therefrom. More particularly, this invention relates to curable compositions comprising epoxy acetals and resins made therefrom.

This application is a continuation-in-part of U.S. Patent No. 3,018,294 entitled "Epoxy Acetals" by B. Phillips and P. S. Starcher, filed June 17, 1959, and assigned to the same assignee as the instant invention.

The curable compositions of the instant invention are low viscosity liquids at temperatures ranging upwards from room temperature. These compositions are compatible with a wide variety of fillers and pigments which may be employed therein, if desired, to adjust the composition viscosity and at the same time enhance the physical properties of resins formed therefrom. These compositions can be easily handled in such resin-forming applications as coating, bonding, laminating, molding, casting, potting and the like, without the need of solvents or diluents although such solvents or diluents can be used, if desired. In casting applications, the compositions can be made to fill small intricacies of molds without applying high pressures or heating to high temperatures. In coating applications, they can be easily spread, brushed, or sprayed on surfaces by the many techniques available to the paint, lacquer and varnish industries. These curable compositions undergo negligible shrinkage when cured and are particularly useful in bonding, casting, molding and potting wherein undue shrinkage is particularly undesirable. Moreover, the compositions of this invention can be easily prepared using low temperatures at which no gelation occurs during preparation. However, they can be cured rapidly at high temperatures. The pot-lives of the novel compositions can be controlled, as desired. These compositions can be made with relatively short pot-lives, of the order of a few minutes, with relatively long pot-lives, of the order of several hours or of several days, or with pot-lives of intermediate duration, as desired.

Resins prepared in accordance with the instant invention are transparent and water-resistant. They can be made as hard, rigid, infusible products, as tough, flexible, infusible products or as products having intermediate degrees of hardness and rigidity or toughness and flexibility, as desired. These resins can be machined to desired shapes and configurations and can be polished to provide appealing finishes. They can be made as infusible products which are resistant to most organic solvents. Furthermore, resins can also be made as products having high heat distortion values, and are capable of sustaining heavy loads at high temperatures. In accordance with this invention, resins having combinations of any one or several of these useful properties can be produced.

The curable compositions and resins of the instant invention are conveniently prepared from monoepoxy acetals and polyepoxy acetals of the following formula:

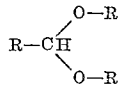

wherein R is a member selected from the class consisting of monovalent aliphatic, alicyclic and aromatic groups, with the provision that at least one R contains a vicinal epoxy group, and at least one R contains an additional group which is selected from the class consisting of vicinal epoxy groups and ethylenic groups. Thus, the monoepoxy acetals, i.e. those compounds containing but one epoxy group, are further characterized in all instances by an ethylenic group and are therefore difunctional in nature. The polyepoxy acetals are, of course, difunctional in that two or more vicinal epoxy groups are present in the molecule. Preferred compounds represented by the aforesaid formula are those wherein R contains up to 22 carbon atoms and more preferably from 3 to 18 carbon atoms in any one chain or group originating at the aldehydic carbon atom. When the R's which are attached to the etheric oxygen atoms contain vicinal epoxy groups they must contain at least 3 carbon atoms so that the epoxy groups are one carbon atom removed from the etheric oxygen.

Particularly preferred epoxy acetals are those compounds wherein R is alkyl, alkenyl, cycloalkyl, polycycloalkyl, cycloalkenyl, polycycloalkenyl, cycloalkylalkyl, cycloalkenylalkyl, bicycloalkenyl, bicycloalkenylalkyl, carbocyclic aryl, aralkyl, alkaryl, alkoxyalkyl, epoxyalkyl, epoxyalkoxyalkyl, epoxycycloalkyl, epoxycycloalkylalkyl, epoxybicycloalkylalkyl and much lower alkyl-substituted derivatives thereof.

Typical compounds illustrative of the epoxy acetals include acetaldehyde allyl glycidyl acetal, acetaldehyde oleyl 9,10-epoxystearyl acetal, butyraldehyde allyl glycidyl acetal, acetaldehyde 2-methyl-2-propenyl 2-methyl-2,3-epoxypropyl acetal, benzaldehyde allyl glycidyl acetal, 3,4-epoxy-6-methylcyclohexanecarboxaldehyde diallyl acetal, 3-oxatricyclo[3.2.1.0$^{2,4}$]octane-6-carboxaldehyde diallyl acetal, benzaldehyde diglycidyl acetal, butyraldehyde di(2,3-epoxybutyl) acetal, 5,5-di(6-methyl-3,4-epoxycyclohexylmethoxy) - 1-pentene, bis(3,4-epoxy-6-methylcyclohexylmethyl) 3,4-epoxy-6-methylcyclohexanecarboxaldehyde acetal, bis(9,10-epoxystearyl) 3,4-epoxy-6-methylcyclohexanecarboxaldehyde acetal, 6-methyl-3-oxatricyclo [3.2.1.0$^{2,4}$]octane-7-carboxaldehyde di(1-methyl-3,4-epoxycyclohexylmethyl) acetal, 1,1,3-tri(2,3-epoxypropoxy)propane, 1,2-epoxy-5,5-di(6-methyl-3,4-epoxycyclohexylmethoxy)pentane, and the like.

A preferred class of epoxy acetals encompasses the monoepoxy acetal compounds of the formula:

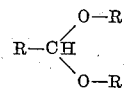

wherein R is as previously indicated and an epoxy group is present in only one of the R groups; the remaining two R's having at least one ethylenic group between them and being aliphatic, alicyclic, or aromatic groups or combinations thereof. The epoxy group can be present on any one of the R groups as part of a straight chain, branched chain, or part of a ring. Preferred compounds within the breadth of this embodiment would include among others the aldehyde alkenyl epoxyalkyl acetals, epoxyaldehyde dialkenyl acetals, epoxyaldehyde alkyl alkenyl acetals, epoxyaldehyde alkenyl aryl acetals, alkyl aldehyde alkenyl epoxyalkyl acetals, aryl aldehyde alkenyl epoxyalkyl acetals, and the like.

A second preferred class encompasses the polyepoxy acetals of the formula:

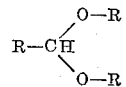

wherein R is as previously indicated and epoxy groups are present in two of the R groups and the remaining R is a saturated or unsaturated aliphatic, alicyclic or aromatic group. As indicated in the previous class, the epoxy groups can be present as part of a straight chain, branched chain, or part of ring. Illustrative compounds include, benzaldehyde diglycidyl acetal, acetaldehyde di(2,3-epoxybutyl) acetal, acetaldehyde di(9,10-epoxystearyl) acetal, butyraldehyde di-glycidyl acetal, butyraldehyde di(2,3-epoxybutyl) acetal, propionaldehyde di(9,10-epoxystearyl) acetal, acetaldehyde di(2-methyl-2,3-epoxypropyl) acetal, phenylacetaldehyde diglycidyl acetal, phenylacetaldehyde di(9,10-epoxystearyl) acetal, stearaldehyde diglycidyl acetal, acetaldehyde di(2-ethyl-2,3-epoxyhexyl) acetal, and isobutyraldehyde diglycidyl acetal.

An additional preferred subclass of polyepoxy acetal compounds within the scope of the aforesaid class include those compounds represented by the following formula:

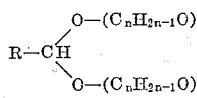

wherein R is as previously indicated; $-(C_nH_{2n-1}O)$ is an epoxyalkyl group wherein O is oxirane oxygen; and $n$ is an integer of from 3 to 18.

The third preferred class encompasses the polyepoxy acetal compounds of the formula:

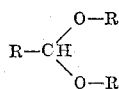

wherein R is as previously indicated and an epoxy group is present in each of the R groups. As indicated in the previous classes, the epoxy groups can be present as part of a straight chain, branched chain, or part of a ring.

A preferred subclass includes the novel tri-(epoxyalkyl) acetals having the formula:

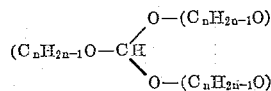

wherein $-(C_nH_{2n-1}O)$ represents an epoxyalkyl group wherein O represents oxirane oxygen and $n$ is an integer from 3 to 18. Illustrative compounds include, among others, 1,1,3-tri-(2,3-epoxypropoxy) propane, 3,4-epoxy-6-methylcyclohexanecarboxaldehyde bis(9,10-epoxystearyl) acetal, 1,2-epoxy-5,5-di-(6-methyl-3,4-epoxycyclohexylmethoxy)pentane, 3,4-epoxy-6-methylcyclohexanecarboxaldehyde bis(3,4 - epoxy-6-methylcyclohexylmethyl) acetal, 6-methyl-3 - oxatricyclo-[3.2.1.0$^{2,4}$]octane-7-carboxaldehyde di-(1-methyl-3,4-epoxycyclohexylmethyl) acetal, and the like. Additionaliiy, compounds containing more than one epoxy group in each of the three R groups are also included.

The epoxy acetal compounds of the three aforementioned classes can be produced in high yields by the epoxidation of the olefinic linkage contained in the unsaturated acetal starting material. In the epoxy acetals prepared from compounds containing only one double bond, the epoxidation is effected quite easily. In the acetals prepared from unsaturated compounds having more than one site of unsaturation, it has been observed that epoxidation can occur selectively. Thus, by appropriate combination of different olefinic groups an essentially complete selectivity can be achieved in the preparation of many epoxy acetals.

The novel resins of the instant invention can be prepared by the homopolymerization or copolymerization of the monoepoxy acetals or the polyepoxy acetals. The monoepoxy acetals are characterized by the presence of one vicinal epoxy group,

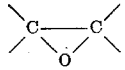

and one or more ethylenic groups
in the molecule. The presence of these two functional groups in the molecule makes them highly useful in a wide variety of chemical reactions whereby novel, useful products are obtained. For example, the monomer can be homopolymerized through the ethylenic group, or the monomer can be copolymerized with other ethylenically unsaturated organic compound(s) through their ethylenic groups, preferably in the presence of a peroxide catalyst (described hereinafter), to give soluble, fusible, essentially linear polymeric products which contain a plurality of free or pendant vicinal epoxy groups. These polymeric products which contain a plurality of free vicinal epoxy groups then can be admixed with an active organic hardener (described hereinafter) and/or an acidic or basic catalyst (described hereinafter) to give curable, polymerizable compositions which can be partially cured or fully cured to infusible, thermoset, cross-linked resinous products. By way of a second illustration, the monomer can be homopolymerized through the vicinal epoxy group, or the monomer can be copolymerized with other polyepoxides (described hereinafter) through the vicinal epoxy groups, preferably in the presence of an acidic or basic catalyst, to give polymeric products which contain a plurality of free or pendant ethylenic groups. These polymeric products which contain a plurality of free ethylenic groups then can be admixed with a vinyl monomer and/or peroxide catalyst and polymerized through the ethylenic groups to give infusible, cross-linked resinous products.

The polyepoxy acetals are characterized by the presence of two or more vicinal epoxy groups, and in some instances, an ethylenic group in the molecule. As previously indicated, the presence of two different functional groups in the same molecule renders them highly useful for homopolymerization or copolymerization through either the ethylenic or epoxy groups.

Homopolymerization of the monoepoxy acetals through the vicinal epoxy group can be effected in the presence of various catalysts (hereinafter defined) to give polymers ranging from viscous liquids to high melting solids. These polymers are useful in hydraulic fluids, lubricating oils and the like. The polymerization reaction can be conducted at a temperature range of from about 10° C. to about 250° C., and higher, and for a period of time ranging from several minutes to several hours. The monoepoxy acetals can be copolymerized with other monoepoxides and/or polyepoxides and polycarboxylic acids and anhydrides. Products ranging from viscous liquids to hard, tough, thermoset resins can be obtained by varying the proportions of the coreactant and epoxy acetal from one to ten and from ten to one parts, respectively. Copolymerization with polyepoxides results in the formation of crosslinked resins, the degree of crosslinking depending on such factors as the proportion of and the functionality of the polyepoxide.

In general, copolymerization with polyepoxides can be carried out in a manner similar to homopolymerization. In addition to catalytic polymerization, the use of stoichiometric hardeners is important when polyepoxides are involved. In such cases a terpolymer is formed and the following types of compounds are generally preferred as the third reactant: (1) polyamines, (2) polycarboxylic acids and anhydrides, (3) polyhydric phenols, (4) polyhydric alcohols, (5) polyisocyanates, (6) and combinations thereof.

Monoepoxides useful for copolymerization with the epoxy acetals of this invention include ethylene oxide, propylene oxide, butylene oxide, styrene oxide, vinylcyclohexene oxide, butyl glycidyl ether, dicyclopentadiene oxide, chloroprene oxide, ethyl 3,4-epoxycyclohexanecarboxylate, vinyl 9,10-epoxystearate, glycidyl methacrylate, isobutylene oxide, butadiene monoxide, cyclohexene oxide, and the like.

Polyepoxides useful as coreactants include butadiene dioxide, diglycidyl ether, vinylcyclohexene dioxide, dicyclopentadiene dioxide, bis(2,3-epoxycyclopentyl)ether, divinylbenzene dioxide, 3,4-epoxycyclohexyl 3,4-epoxycyclohexanecarboxylates, glycol bis(3,4-epoxyclohexanecarboxylates), bis(3,4-epoxycyclohexyl)carboxylates, diglycidyl phthalate, soybean oil epoxide, the epoxides derived from polyphenols (particularly 2,2-bis(p-hydroxyphenyl)-propane and epichlorohydrin), epoxidized polybutadienes and copolymers of butadiene, and the like.

The polyepoxy acetals can likewise be homopolymerized through the vicinal epoxy groups to give thermoset resins which can range from flexible to hard, high softening materials depending on such factors as epoxide structure and functionality, polymerization catalyst, and the like. Such resins have utility as rigid and flexible foams, potting and encapsulation of electrical components, and the like. Moreover, the polyepoxy acetals can be copolymerized with a variety of active organic hardeners such as for example, polyamines, polycarboxylic acids and anhydrides, polyols, polyisocyanates, and the like, to give partially cured, fusible, thermosetting, intermediate reaction products, or novel fully cured, insoluble, infusible, thermoset, cross-linked resinous products. This reaction can be conducted at a temperature in the range of from about 10° C. to about 250° C. The reaction time will depend, of course, on the degree of cure desired and other considerations well known to the epoxy artisan.

It is to be understood that by the term "copolymer," as used herein including the appended claims, is meant a product which results from the copolymerization reaction of two or more copolymerizable monomers, said monomers entering into the copolymerization reaction in significant quantities. As such, the resulting copolymeric products are chemically distinguishable from the homopolymeric products which would result from the homopolymerization of the monomers separately. It is preferred, however, that the novel copolymeric products of the invention contain from about 5 to about 95 weight percent of the epoxy acetal. Moreover, the novel homopolymers and novel copolymers are essentially linear, fusible, addition products which range from viscous liquids to solid products.

The acidic and basic catalysts which can be employed in the appropriate embodiments discussed supra include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-monoethylamine complex, boron trifluoride-dimethyl ether complex, boron trifluoride-diethyl ether complex, boron trifluoride-dipropyl ether complex, and the like; the strong mineral acids, e.g., phosphoric acid, polyphosphoric acid, and the like; the saturated aliphatic hydrocarbon sulfonic acids and the aromatic hydrocarbon sulfonic acids, e.g., ethanesulfonic acid, propanesulfonic acid, benzenesulfonic acid, toluenesulfonic acid, naphthalenesulfonic acid, lower alkyl substituted-benzenesulfonic acid, and the like; the stannous acylates, e.g., stannous acetate, stannous butyrate, stannous hexanoate, stannous octanoate, stannous benzoate, and the like; the stannic alkoxides, e.g., stannic butoxide, stannic 2-ethylhexoxide, and the like; the alkali metal hydroxides, e.g., sodium hydroxide, potassium hydroxide, and the like; the tertiary amines, e.g., trimethylamine, triethylamine, and the like. The boron trifluoride-amine complexes are highly preferred. The acidic or basic catalysts can be employed in amounts ranging from about 0.005 to about 20, and higher, weight percent, based on the total weight of epoxide component(s). It is pointed out that by the term "vicinal epoxy polymerization catalyst," as used herein including the appended claims, is meant those catalysts, such as illustrated above, which effect the homopolymerization or copolymerization of the epoxide component(s) through the vicinal epoxy groups.

The peroxide catalysts which can be employed in the homopolymerization or copolymerization of monoepoxy acetals through the ethylenic groups discussed supra include, for instance, benzoyl peroxide, methyl ethyl ketone peroxide, methyl isobutyl ketone peroxide, p-methane hydroperoxide, t-butyl hydroperoxide, cumene hydroperoxide, acetyl peroxide, cyclohexanone peroxide, lauroyl peroxide, di-t-butyl peroxide, t-butyl perbenzoate, and the like. The concentration of the peroxide catalyst can range from about 0.01, and lower, to about 5.0, and higher, weight percent, based on the total weight of ethylenic component(s).

Among the ethylenically unsaturated comonomers which are contemplated in the aforementioned paragraph are those which contain a polymerizable ethylenic bond. Illustrative ethylenically unsaturated compounds include, for example, styrene, alkylstyrene, chlorostyrene, ethylstyrene, dimethylstyrene, isopropylstyrene, divinylbenzene, alkyl acrylate, alkyl methacrylate, alkyl crotonate, methyl acrylate, ethyl acrylate, n-propyl acrylate, n-butyl acrylate, methyl methacrylate, ethyl methacrylate, isopropyl methacrylate, n-amyl methacrylate, methyl crotonate, ethyl crotonate, n-propyl crotonate, t-butyl crotonate, 2-ethylhexyl crotonate, vinyl acetate, vinyl propionate, vinyl butyrate, vinyl valerate, and the like. Additional desirable monomeric ethylenically unsaturated compounds include, for instance, triallyl cyanurate, diallyl phthalate, triallylamine, acrylonitrile, allyl acrylate, allyl methacrylate, allyl crotonate, allyl butyrate, allyl 2-ethylhexanoate, allyl benzoate, and the like.

The active organic hardeners which can be employed include polycarboxylic acids, polycarboxylic acid anhydrides, polyfunctional amines, polyols, polythiols, polyisocyanates, polyacyl halides, and the like. The active organic hardeners illustrated hereinafter can be employed in a curing amount, that is, an amount which is sufficient to cause the curable system comprising the novel epoxide component(s) to become a thermosetting or thermoset copolymeric resin in accordance with the teachings of the instant specification.

Representative polycarboxylic acids which are contemplated include, for instance, oxalic acid, succinic acid, glutaric acid, adipic acid, suberic acid, alkylsuccinic acids, alkenylsuccinic acids, maleic acid, itaconic acid, allylmalonic acid, 3-hexynedioic acid, 1,2-cyclohexanedicarboxylic acid, phthalic acid, terephthalic acid, and the like. It is desirable to employ the polycarboxylic acid and epoxide component in such relative amounts so as to provide from about 0.2 to about 2.0 carboxy groups, i.e., —COOH groups, of said acid per epoxy group, i.e.,

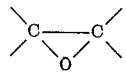

group, of said epoxide component.

Illustrative polycarboxylic acid anhydrides include, for example, phthalic anhydride, tetrahydrophthalic anhydride, maleic anhydride, glutaric anhydride, succinic anhydride, nonenylsuccinic anhydride, 1,8-naphthalic anhydride, lower alkyl substituted-bicyclo[2.2.1]hept-5-ene-2,3-dicarboxylic anhydride, methylbicyclo[2.2.1]hept-2-ene-2,3-dicarboxylic anhydride, and the like. The polycarboxylic acid anhydride and epoxide component are employed in such relative amounts so as to provide from about 0.1 to about 4.0 carboxy groups of said anhydride per epoxy group of said epoxide component. It should be noted that by the expression "carboxy groups of said anhydride" is meant the carboxy groups which would be contained by the corresponding polycarboxylic acid. For example, succinic anhydride does not possess any carboxy groups per se; however, the corresponding polycarboxylic acid is succinic acid which contains two free carboxy groups. Thus, succinic anhydride has two carboxy groups as applied in the above expression. In different language, by the expression "carboxy groups of said anhydride" is meant the carboxy groups contained in the "hydrated" polycarboxylic acid anhydride.

Representative polyols include, by way of example, ethylene glycol, diethylene glycol, the polyethylene glycols, propylene glycol, the polypropylene glycols, 1,1,1-trimethylolpropane, the polyvinyl alcohols, the cyclopentanediols, the cyclohexanediols, resorcinol, catechol, bis(4-hydroxyphenyl)-2,2-propane, 1,8-naphthalenediol, and the like. It is pointed out that the term "polyol," as used herein, includes those organic compounds which have at least two hydroxy (—OH) groups and they can be alcoholic hydroxy groups, phenolic hydroxy groups, or both alcoholic and phenolic hydroxy groups. The term "polyol" preferably encompasses the polyhydric alcohols and the polyhydric phenols. In general, the proportions of polyol and epoxide component are such so as to provide from about 0.1 to about 2.0 hydroxy groups of said polyol per epoxy group of said epoxide component.

Among the polyfunctional amines contemplated include the aliphatic amines, the aromatic amines, the aralkyl amines, the cycloaliphatic amines, the alkaryl amines, the aliphatic polyamines which include the polyalkylene polyamines, the amino-substituted monohydric and polyhydric aliphatic alcohols and phenols, the addition products of polyamines and low molecular weight epoxides containing oxirane oxygen linked to vicinal carbon atoms, and others. By the term "polyfunctional amine," as used herein, is meant an organic amine having at least two active amino hydrogen atoms which can be on the same nitrogen atom or on different nitrogen atoms. The relative proportions of polyfunctional amine and epoxide component provide from about 0.2 to about 4.0 amino hydrogen atoms of the amine per epoxy group of the polyepoxy acetal.

In general, the novel curable epoxy acetal resin compositions can be conveniently prepared by admixing with the epoxy acetals the desired vicinal epoxy polymerization catalyst, peroxide catalyst, active organic hardener, or other desired components of the resin composition. Fillers of various sorts may also be employed if desired. The curing reaction may be accelerated by heat and post curing at elevated temperatures employed to improve heat-distortion, hardness, and like properties.

The novel, curable, polymerizable compositions comprising an epoxide component(s) can be readily handled in resin-forming operations such as coating, laminating, bonding, molding, casting, potting, encapsulating, and the like. These polymerizable compositions are capable of accepting solid materials, such as fillers and pigments, for providing various effects in physical properties and coloration. With or without such added solid materials, these polymerizable compositions can be made to fill small intricacies of molds without the necessity of applying high pressures or heating to high temperatures, although such measures can be employed, if desired. These polymerizable compositions can be cured in molds which have intricate surfaces, and the resulting molded resin exhibits exact and fine details of the mold. These polymerizable compositions, also, can be advantageously employed in the potting of fragile articles such as electronic components.

The novel polymerizable compositions comprising an ethylenic component(s) readily yield novel polymeric products (as illustrated previously) which products have utility as hydraulic fluids, lubricating oils, molding compositions, cable insulation, and the like. In addition, these novel polymeric products have a variety of uses in the rubber art as is readily apparent to the artisan skilled in this art.

EXAMPLE 1

*Preparation of 1,1,3-Tri-(2,3-Epoxypropoxy)-Butane*

To 452 grams of 1,1,3-triallyloxybutane (from the reaction of crotonaldehyde with allyl alcohol) which was heated with stirring to 50° C.–55° C., there was added 1955 grams of a 27.2 percent solution of peracetic acid in ethyl acetate dropwise over a period of five hours. After an additional three hours the reaction was 91 percent complete as indicated by analysis for unreacted peracetic acid. The cooled reaction mixture was passed through a steam-heated stripper once at a pressure of 50 millimeters of mercury and again at 5 millimeters pressure to remove the volatiles from the product. The stripped product was then flash-distilled to give an almost colorless liquid, which upon analysis gave 80 percent as 1,1,3-tri-(2,3-epoxypropoxy) butane by the pyridine hydrochloride method, in 63 percent yield based on peracetic acid. A sample of this product was redistilled through a short Vigreaux column to give colorless material, 87.5 percent as 1,1,3-tri-(2,3-epoxypropoxy) butane, boiling point 154°/0.6 millimeter, $n$ 30/D 1.4593.

EXAMPLE 2

*Preparation of 1,1,3-Tri-(2,3-Epoxypropoxy)Propane*

To 424 grams of 1,1,3-triallyloxypropane, prepared from allyl alcohol and acrolein by the method outlined in U.S. Patent 2,561,254, which was maintained with stirring at 55° C.–60° C., there was added 1980 grams of a 26.9 percent solution of peracetic acid in ethyl acetate dropwise over a period of five hours. After an additional two hours at 60° C., the reaction was 96.7 percent complete as indicated by titration for unreacted peracetic acid. The reaction mixture was passed through a steam-heated stripper once at a pressure of 50 millimeters of mercury and again at a pressure of 7 millimeters to remove the volatiles from the product. The stripped product was then flash distilled to give 285 grams of 1,1,3-tri-(2,3-epoxypropoxy)propane which contained 10.55 percent oxirane oxygen as determined by the pyridine hydrochloride method.

EXAMPLE 3

*Preparation of 6-Methyl-3-Cyclohexenecarboxyaldehyde Diallyl Acetal*

A mixture of 671 grams (5 mols) of 6-methyl-3-cyclohexenecarboxaldehyde, 870 grams (15 mols) of allyl alcohol, 500 grams of benzene, and 7.5 grams of paratoluenesulfonic acid was charged to the kettle of a still equipped with a fractionation column. The reaction mixture was heated under reflux at atmospheric pressure for a period of 22 hours, during which time 111 cubic centimeters of lower layer (Constant Boiling Mixture of allyl alcohol, benzene, and water) separated in the still head. The catalyst was neutralized with sodium ethoxide, and the reaction mixture was distilled under pressure. There was obtained 653 grams (59 percent yield) of 6-methyl-3-cyclohexenecarboxaldehyde diallyl acetal having the following properties: boiling point, 113° C. at 5 millimeters pressure; refractive index 1.4698 ($n$ 30/D), density at 27° C., 0.9375. Analysis calculated for $C_{14}H_{22}O_2$: C, 75.67; H, 9.97. Found: C, 75.47; H, 9.87. The infrared spectrum was consistent with the assigned structure.

EXAMPLE 4

*Preparation of 3,4-Epoxy-6-Methylcyclohexanecarboxaldehyde Diallyl Acetal*

To 389 grams (1.726 mols) of 6-methyl-3-cyclohexenecarboxaldehyde diallyl acetal was added dropwise, over a period of 95 minutes, 510 grams of a 28.3 percent solution of peracetic acid (1.9 mols) in ethyl acetate at a temperature of 30° C. After an additional 1.5 hour reaction period 96 percent of the theoretical amount of peracetic acid (for the monoxide) had been consumed. The reaction mixture was then fed dropwise to the kettle of a still containing 500 grams of ethylbenzene which was heated under reflux at such a pressure as to maintain a kettle temperature of 50° C. Ethyl acetate, acetic acid, and excess peracetic acid were removed continuously. The product was purified by fractional distillation to obtain 273 grams of 3,4-epoxy-6-methylcyclohexanecarboxaldehyde diallyl acetal, a colorless liquid having the following properties: boiling point, 126° C. at 2 millimeters; $n$ 30/D=1.4730; purity by the pyridine hydrochloride method of analysis, 99.1 percent. Analysis calculated for $C_{14}H_{22}O_3$: C, 70.56; H, 9.29. Found: C, 70.55; H, 9.14.

EXAMPLE 5

*Preparation of 6-Methyl-3-Cyclohexenecarboxaldehyde Bis(6-Methyl-3-Cyclohexenylmethyl) Acetal*

A mixture of 373 grams (3 mols) of 6-methyl-3-cyclohexenecarboxaldehyde, 1010 grams (8 mols) of 6-methyl-3-cyclohexenylmethanol, 1000 cubic centimeters of toluene, and 6.9 grams of p-toluenesulfonic acid was charged to a still equipped with a fractionating column and a decanter-type still head. The mixture was heated under reflux and the water removed continuously as it was formed. After 8 hours, 53 cubic centimeters of water had been removed. The catalyst was neutralized by adding 3.3 grams of sodium acetate, and 25 cubic centimeters of 95 percent ethanol in which 1 gram of sodium had been dissolved. The reaction mixture was flash-distilled through a one-plate column and then fractionated in a second distillation. There was obtained 858 grams of 6-methyl-3-cyclohexenecarboxaldehyde bis(6-methyl-3-cyclohexenylmethyl) acetal, a colorless liquid having the following properties: boiling point 210° C. at 3 millimeters; $n\ 30/D=1.5010$; $D\ 25.5=0.9819$. Analysis calculated for $C_{24}H_{38}O_2$: C, 80.36; H, 10.78. Found: C, 80.45; H, 10.85. The infrared spectrum was consistent with the proposed structure.

EXAMPLE 6

*Preparation of 3,4-Epoxy-6-Methylcyclohexanecarboxaldehyde Bis(3,4 - Epoxy - 6 - Methylcyclohexylmethyl) Acetal*

To a solution of 200 grams (0.559 mol) of 6-methyl-3 - cyclohexenecarboxaldehyde bis(6 - methyl - 3 - cyclohexenylmethyl) acetal in 100 grams of ethylbenzene was added 555 grams of a 28.8 percent solution of peracetic acid (2.1 mols) in ethyl acetate over a period of 30 minutes at a temperature of 40° C. After an additional reaction period of 1.67 hours at 40° C., the theoretical amount of peracetic acid had been consumed. An additional 500 grams of ethylbenzene was used to help remove the acetic acid and other volatiles from the product by codistillation. After stripping to a kettle temperature of 80° C. at 8 millimeters pressure, there was obtained 291 grams of a residue product which had the following properties: viscous pale yellow liquid, analysis by pyridine-hydrochloride method for epoxide=87.4 percent calculated as 3,4-epoxy-6-methylcyclohexanecarboxaldehyde bis(3,4 - epoxy - 6 - methylcyclohexylmethyl) acetal, iodine number=2.3, acidity calculated as acetic acid=0.2 percent.

EXAMPLE 7

*Preparation of 6-Methyl-3-Oxatricyclo[3.2.1.0$^{2,4}$]Octane-7-Carboxaldehyde Di(1-Methyl-3,4-Epoxycyclohexylmethyl) Acetal*

(A) *3-methylbicyclo[2.2.1]5-heptene - 2 - carboxaldehyde di - (1 - methyl - 3 - cyclohexenylmethyl) acetal.*—A weight of 136 grams (1 mol) of refined 3-methylbicyclo[2.2.1]-5-heptene-2-carboxaldehyde was mixed with 315 grams (2.5 moles) of 1-methyl-3-cyclohexenylmethanol and refluxed in the presence of 500 milliliters of ethylene dichloride and 4 grams of p-toluenesulfonic acid. When 18 grams of water had been removed by distillation, the reaction mixture was neutralized and filtered over anhydrous sodium sulfate. Subsequent distillation gave 193 grams (52 percent of the theoretical yield) of 3-methylbicyclo[2.2.1]-5-heptene - 2 - carboxaldehyde di(1-methyl-3-cyclohexenylmethyl) acetal at a boiling point of 96–100° C. at 0.1 millimeter ($n\ 30/D=1.4861–1.5003$). Analysis by iodine value determinations gave a value of 206 compared to a theoretical of 205.6.

(B) *6-methyl-3-oxatricyclo[3.2.1.0$^{2,4}$]octane-7-carboxaldehyde di(1-methyl-3,4-epoxycyclohexylmethyl) acetal.*—A weight of 83 grams (0.224 mole) of 3-methylbicyclo[2.2.1]-5-heptene-2-carboxaldehyde di(1-methyl-3-cyclohexenylmethyl) acetal was allowed to react with 206 grams (0.751 mole) of a 27.7 percent solution of peracetic acid in ethyl acetate at 25° C. to 30° C. for a 45-minute period. The consumption of peracid by the olefin was complete at that time. Conventional azeotropic removal (ethylbenzene) of the volatile components of the reaction mixture provided a non-distillable residue product which analyzed 47.5 percent as the expected triepoxide, 6-methyl-3-oxatricyclo[3.2.1.0$^{2,4}$]octane-7-carboxaldehyde di(1-methyl-3,4-epoxycyclohexylmethyl) acetal.

EXAMPLE 8

*Preparation of 5,5-Di(6-Methyl-3,4-Epoxycyclohexylmethoxy)-1-Pentene*

(A) *5,5-di(6-methyl-3-cyclohexenylmethoxy) - 1 - pentene.*—A mixture of 96 grams (1.38 mole) of 4-pentenal, 428 grams of 6-methyl-3-cyclohexenylmethanol, 500 milliliters of ethylene dichloride and 3 grams of p-toluenesulfonic acid was refluxed at atmospheric pressure until no more water was observed at the still head attached to the reaction vessel (a period of approximately three hours). After neutralization of the catalyst, distillation of the reaction mixture gave 158 grams (36 percent of the theoretical yield) of 5,5-di(6-methyl-3-cyclohexenylmethoxy)-1-pentene at a boiling point of 142° C.–145° C. at 0.6 millimeter ($n\ 30/D=1.4828–1.4848$; $I_2$ value=243; theory $I_2$ value=239).

(B) *5,5-di(6-methyl-3,4 - epoxycyclohexylmethoxy)-1-pentene.*—A weight of 74.5 grams (0.234 mole) of 5,5-di(6-methyl-3-cyclohexenylmethoxy) - 1 - pentene was allowed to react with 165 grams (0.6 mole) of a 27.7 percent solution of peracetic acid in ethyl acetate over a two hour and 15 minute period at 40° C. After that period, analysis showed that two moles of peracid per mole of olefin used had been consumed. The volatile components of the reaction mixture were rapidly removed by vacuum evaporation to provide 82 grams of a residue product (quantitative yield) which analyzed 96.6 percent pure as 5,5-di(6-methyl-3,4-epoxycyclohexylmethoxy)-1-pentene ($n\ 30/D=1.4862$).

Infrared absorption studies showed that no unsaturation remained in the cyclic six-membered rings while the terminal unsaturation remained.

EXAMPLE 9

*Preparation of 1,2-Epoxy-5,5-Di-(6-Methyl-3,4-Epoxycyclohexylmethoxy)Pentane*

A weight of 70 grams (0.22 mole) of 5,5-di(6-methyl-3-cyclohexenylmethoxy)-1-pentene was allowed to react at 55° C. with 219 grams (0.80 mole) of a 27.7 percent solution of peracetic acid in ethyl acetate for a period of three and one half hours. At that time, analysis showed 98 percent of the available peracid equivalent to the olefin employed had been consumed. The coproduct acetic acid was then removed as an azeotrope with ethylbenzene. Removal of the excess ethylbenzene gave a residue product which by analysis contained 74.8 percent of the expected triepoxide. Subsequent reduced-pressure distillation gave 49 grams (60.8 percent of the theoretical yield of 1,2-epoxy-5,5-di(6-methyl-3,4-epoxycyclohexylmethoxy)pentane, boiling point, 202° C.–205° C. at 0.1 millimeter; $n\ 30/D=1.4888–1.4891$; purity by pyridine hydrochloride method=98.7 percent.

Although the invention has been illustrated by the preceding examples, the invention is not to be construed as limited to the materials employed in the above examples, but rather, the invention encompasses the generic invention as hereinbefore disclosed. Various modifications and embodiments of this invention can be made without departing from the spirit and scope thereof.

In the following examples, resin preparations were generally carried out in test tubes by weighing and mixing the indicated components, stopping the test tube with a cork, and placing it in an oven at the temperature and time indicated. Gel points were arbitrarily defined as the point at which the resin did not adhere to a cold (25° C.) metal spatula. After reaching the gel point, the resins were then post cured at elevated temperatures in order to effect maximum cure. After curing the resins were allowed to cool to room temperature at which time the test tube was broken and the resin removed and examined. Evaluation of the resins included a determination of Barcol hardness (Barcol Impressor GYZJ-934-1); heat distortion point, ° C. (ASTM D-648-45T); and Izod impact, ft. lbs./in. notch (ASTM D-256-47T). For the latter two tests, test bars were cast in aluminum foil molds measuring 5½ x ¾ x ¾ inches and machined to about 4½ x ½ x ¼ inches. Unless otherwise indicated, the products were described or examined at room temperature, i.e. about 24° C.

EXAMPLES 10–12

Homopolymerization of Monoepoxy Acetals

The indicated monoepoxy acetal (1.0 gram) was charged to two test tubes and boron trifluoride-monoethylamine complex (0.05 gram) was added to one test tube and one drop (0.015 gram) of a 17 percent solution of sodium hydroxide in ethylene glycol was added to the second test tube. The resulting mixtures were heated for three hours at 120° C. plus four hours at 160° C. and the resulting products were examined at room temperature. Table I below contains the pertinent data:

TABLE I.—HOMOPOLYMERIZATION OF MONOEPOXY ACETALS

| Example | Epoxy acetal | Description after curing | |
|---|---|---|---|
| | | Potassium hydroxide catalyst | Boron trifluoride-monoethylamine catalyst |
| 10 | Acetaldehyde allyl glycidyl acetal | Orange viscous liquid | Viscous liquid. |
| 11 | Diallyl 3,4-epoxy-6-methyl-cyclohexanecarboxaldehyde acetal. | | Firm solid. |
| 12 | Diallyl 3-oxatricyclo-[3.2.1.0²,⁴] octane-6-carboxaldehyde acetal. | | Firm solid. |

EXAMPLES 13–17

Homopolymerization of Polyepoxy Acetals

The polyepoxy acetal in the quantity indicated in Table II below, was charged to a test tube and the catalyst added. The resulting mixtures were then heated at 120° C. and cured at 160° C. for the periods indicated. The resin obtained were evaluated at room temperature.

TABLE II.—HOMOPOLYMERIZATION OF POLYEPOXY ACETALS

| Example | Polyepoxy acetal | Grams | Catalyst | Grams | Gel time, hours, ° C. | Cure time, hours, ° C. | Resin description |
|---|---|---|---|---|---|---|---|
| 13 | Acetaldehyde diglycidyl acetal | 0.9 | KOH a | 0.02 | | 29 hrs., 120° C | Soft, solid. |
| 14 | Acetaldehyde bis(2-methylglycidyl) acetal. | 1.0 | DMP b | 0.08 | | 14 hrs., 120° C | Do. |
| 15 | 4-Pentenal di(6-methyl-3,4-epoxy-cyclohexylmethyl) acetal. | 0.9 | BF₃-piperidine | 0.1 | 2 min., 120° C | 3.5 hrs. 120° C., 6 hrs., 160° C. | Brittle. |
| 16 | 1,1,3-tris(2,3-Epoxypropoxy) butane | 1.0 | KOH ¹ | 0.007 | | >6 hrs., 160° C | Tough, Barcol, 19. |
| 17 | bis(6-Methyl-3,4-epoxycyclohexyl-methyl) 6-methyl-3,4-epoxycyclo-hexanecarboxaldehyde acetal. | 1.5 | BF₃-piperidine | 0.1 | | 2 hrs., 120° C., 6 hrs., 160° C. | Tough, Barcol, 18. | a 20 weight percent in ethylene glycol.
b Tris(dimethylaminoethyl) phenol.

EXAMPLES 18–21

Copolymerization of Polyepoxy Acetals and Polyamines

Resins were prepared from polyepoxy acetals by mixing them with polyamine in the proportions indicated in Table III below. All mixtures were post cured at elevated temperatures and examined at room temperature.

TABLE III.—COPOLYMERIZATION OF POLYEPOXY ACETALS AND POLYAMINES

| Example | Polyepoxy acetal | Grams | Polyamine | Grams | Gel time, hours, ° C. | Cure time, hours, ° C. | Resin description |
|---|---|---|---|---|---|---|---|
| 18 | Acetaldehyde diglycidyl acetal | 2.6 | MDA a | 1.5 | 4 min., 120° C | 1.1 hrs., 120 °C | Tough, Barcol, 13. |
| 19 | Acetaldehyde diglycidyl acetal | 0.9 | Ethylenediamine | 0.15 | 5 min., 50° C | 6 hrs., 50° C., 6 hrs., 160° C. | Tough, flexible. |
| 20 | 4-Pentenal di(6-methyl-3,4-epoxycy-clohexylmethyl) acetal. | 0.9 | DETA b | 0.14 | 0.6 min., 120° C | 3.5 hrs., 120° C., 6 hrs., 160° C. | Tough, Barcol, 18. |
| 21 | 1,1,3-tris(2,3-Epoxypropoxy) butane | 1.0 | Xylylene-diamine. | 0.34 | 4 min., 20° C | 4 hrs., 20° C., 2 hrs., 80° C., 6 hrs., 160° C. | Tough, Barcol, 45. | a p,p′-Methylenedianiline.
b Diethylenetriamine.

EXAMPLES 22–25

Copolymerization of Polyepoxy Acetals and Phthalic Anhydride

Resins were prepared from polyepoxy acetals by mixing them with phthalic anhydride in the proportions indicated in Table IV below. All mixtures were post cured at elevated temperatures and examined at room temperature.

TABLE IV.—COPOLYMERIZATION OF POLYEPOXY ACETALS AND PHTHALIC ANHYDRIDE

| Example | Polyepoxy acetal | Grams | Grams of phthalic anhydride | Gel time, hours, °C. | Cure time, hours, °C. | Resin description |
|---|---|---|---|---|---|---|
| 22 | Acetaldehyde diglycidyl acetal | 0.9 | 0.9 | | 31 hrs., 120° C., 6 hrs., 160° C. | Flexible. |
| 23 | Acetaldehyde bis(2-methylglycidyl) acetal | 1.0 | 0.9 | | 25 hrs., 120° C | Do. |
| 24 | 4-Pentenal di(6-methyl-3,4-epoxycyclohexylmethyl) acetal. | 0.9 | 0.4 | 1 min., 120° C | 3.5 hrs., 120° C., 6 hrs., 160° C. | Hard, brittle. |
| 25 | bis(6-Methyl-3, 4-epoxy-cyclohexylmethyl) 6-methyl-3,4-epoxycyclohexanecarboxaldehyde acetal. | 1.5 | 0.7 | 0.1 hr., 120° C | 2 hrs., 120° C., 6 hrs., 160° C | Tough, Barcol, 45. |

EXAMPLES 26–28

*Copolymerization of Polyepoxy Acetals, Maleic Anhydride, and Polyols*

Resins were prepared from polyepoxy acetals by mixing them with maleic anhydride and the polyols indicated in Table V below. All mixtures were post cured at elevated temperatures and examined at room temperature.

TABLE V.—COPOLYMERIZATION OF POLYEPOXY ACETALS, MALEIC ANHYDRIDE, AND POLYOLS

| Example | Polyepoxy acetal | Grams | Grams of maleic anhydride | Grams of polyol | Gel time, hours, °C. | Cure time, hours, °C. | Resin description |
|---|---|---|---|---|---|---|---|
| 26 | Acetaldehyde diglycidyl acetal. | 1.7 | 1.6 | a 0.2 | 6.5 hrs., 80° C., 3.5 hrs., 100° C. | 6.5 hrs., 80° C., 3.5 hrs., 100° C., 20 hrs., 120° C., 11 hrs., 160° C. | Hard, tough. |
| 27 | 1,1,3-tris(2,3-Epoxypropoxy) propane. | 1.0 | 0.5 | b 0.1 | 5 hrs., 80° C., 0.5 hr., 120° C. | 5 hrs., 80° C., 8 hrs., 120° C., 6 hrs., 160° C. | Do. |
| 28 | 1,1,3-tris(2,3-Epoxypropoxy) propane. | 1.5 | 0.5 | a 0.1 | 4 hrs., 120° C | 11 hrs., 120° C., 6 hrs., 160 C | Flexible. | a Ethylene glycol.
b Glycerol.

EXAMPLES 29–32

*Copolymerization of Polyepoxy Acetals and Adipic Acid*

Resins were prepared from polyepoxy acetals by mixing them with adipic acid in the proportions indicated in Table VI below. All mixtures were post cured at elevated temperatures and examined at room temperature.

TABLE VI.—COPOLYMERIZATION OF POLYEPOXY ACETALS AND ADIPIC ACID

| Example | Polyepoxy acetal | Grams | Grams of adipic acid | Gel time, hours, °C. | Cure time, Hours, °C. | Resin description |
|---|---|---|---|---|---|---|
| 29 | 4-Pentenal di(6-methyl-3,4-epoxycyclohexylmethyl) acetal. | 0.9 | 0.2 | | 10 hrs., 120° C., 6 hrs., 160° C | Flexible. |
| 30 | 1,1,3-tris(2,3-Epoxypropoxy) butane | 1.0 | 0.7 | 15-28 hrs., 120° C | 38 hrs., 120° C., 6 hrs., 160° C | Do. |
| 31 | 1,1,3-tris(2,3-Epoxypropoxy) propane | 1.5 | 0.7 | | 19 hrs., 120° C., 85 hrs., 160° C | Do. |
| 32 | bis(6-Methyl-3,4-epoxycyclohexylmethyl) 6-methyl-3,4-epoxycyclohexanecarboxaldehyde acetal. | 1.5 | 0.4 | 1 min., 120° C | 2 hrs., 120° C., 6 hrs., 160° C | Tough, Barcol, 12. |

EXAMPLES 33–36

*Copolymerization of Polyepoxy Acetals and Polyols*

Resins were prepared from polyepoxy acetals by mixing them with polyols in the proportions indicated in Table VII below. All mixtures were post cured at elevated temperatures and examined at room temperature.

TABLE VII.—COPOLYMERIZATION OF POLYEPOXY ACETALS AND POLYOLS

| Example | Polyepoxy acetal | Grams | Polyol | Grams | Gel time, hours, °C. | Cure time, hours, °C. | Resin description |
|---|---|---|---|---|---|---|---|
| 33 | Acetaldehyde diglycidyl acetal | 0.9 | Bisphenol A | 0.9 | | 40 hrs., 120° C., 6 hrs., 160° C. | Soft. |
| 34 | 1,1,3-tris(2,3-Epoxypropoxy) butane | 1.0 | do | 1.1 | 33 hrs., 120° C | 38 hrs., 120° C., 6 hrs., 160° C. | Hard, brittle. |
| 35 | 1,1,3-tris(2,3-Epoxypropoxy) propane | 1.5 | do | 1.1 | | 19 hrs., 120° C., 8.5 hrs., 160° C. | Flexible. |
| 36 | bis(6-Methyl-3,4-epoxycyclohexylmethyl) 6-methyl-3,4-epoxycyclohexanecarboxaldehyde acetal. | 1.5 | do | 0.9 | 7 hrs., 120° C | 10.5 hrs., 120° C., 6 hrs., 160° C. | Brittle, Barcol, 15. |

EXAMPLES 37–39

Copolymerization of Polyepoxy Acetals and Polyisocyanates

Resins were prepared from polyepoxy acetals and polyisocyanates, and also from polyepoxy acetals, polyisocyanates, and polyols in the proportions indicated in Table VIII below. All mixtures were post cured at elevated temperatures and examined at room temperature.

TABLE VIII.—COPOLYMERIZATION OF POLYEPOXY ACETALS AND POLYISOCYANATES

| Example | Polyepoxy acetal | Grams | Grams of toluene diisocyanate | Grams of ethylene glycol | Grams of catalyst | Gel time, hours, °C. | Cure time, hours, °C. | Resin description |
|---|---|---|---|---|---|---|---|---|
| 37 | Acetaldehyde diglycidyl acetal. | 0.9 | 0.44 | | a 0.04 | 0.25 hrs., 80° C. | 1 hr., 180° C., 2.5 hrs., 120° C., 6 hrs., 160° C. | Hard, brittle. |
| 38 | Acetaldehyde diglycidyl acetal. | 7.1 | 2.1 | 0.8 | b 0.3 | 16 hrs., 26° C. | 5 hrs., 80° C., 6.5 hrs., 120° C., 6 hrs., 160° C. | Flexible. |
| 39 | Acetaldehyde bis(2-methylglycidyl) acetal. | 1.0 | 0.2 | 0.1 | b 0.02 | | 2 hrs., 26° C., 6 hrs., 80° C., 2 hrs., 120° C., 6 hrs., 160° C. | Do. | a Boron trifluoride-piperidine complex.
b Boron trifluoride-monoethylamine.

Although the invention has been illustrated by the preceding examples, it is not to be construed as limited to the materials employed therein, but rather, the invention encompasses the generic area as hereinbefore disclosed. Various modifications and embodiments of this invention can be made without departing from the spirit and scope thereof.

What is claimed is:

1. The polymerized product obtained by the polymerization of an epoxy acetal of the formula:

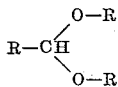

wherein R is a monovalent hydrocarbon group and contains up to 22 carbon atoms, with the proviso that at least one R contains a vicinal epoxy group, and at least one R contains an additional group selected from the class consisting of vicinal epoxy and ethylenic groups; said vicinal epoxy groups being at least one carbon atom removed from etheric oxygen atoms.

2. The polymerized product obtained by the polymerization of an alkyl aldehyde di(epoxyalkyl) acetal and an active organic hardener selected from the group consisting of polycarboxylic acids, polycarboxylic acid anhydrides, polyfunctional amines and polyols.

3. The polymerized product obtained by the polymerization of an alkenyl aldehyde di(epoxyalkyl) acetal and an active organic hardener selected from the group consisting of polycarboxylic acids, polycarboxylic acid anhydrides, polyfunctional amines and polyols.

4. The polymerized product obtained by the polymerization of a carbocyclic aryl aldehyde di(epoxyalkyl) acetal and an active organic hardener selected from the group consisting of polycarboxylic acids, polycarboxylic acid anhydrides, polyfunctional amines and polyols.

5. The polymerization product obtained by the polymerization of an epoxyalkyl aldehyde di(epoxyalkyl) acetal and an active organic hardener selected from the group consisting of polycarboxylic acids, polycarboxylic acid anhydrides, polyfunctional amines and polyols.

6. The polymerization product obtained by the polymerization of an alkenyl aldehyde di(epoxycycloalkyl) acetal and an active organic hardener selected from the group consisting of polycarboxylic acids, polycarboxylic acid anhydrides, polyfunctional amines and polyols.

7. The polymerization product obtained by the polymerization of on epoxyalkyl aldehyde di(epoxycycloalkyl) acetal and an active organic hardener selected from the group consisting of polycarboxylic acids, polycarboxylic acid anhydrides, polyfunctional amines and polyols.

8. The polymerization product obtained by the polymerization of an epoxycycloalkyl aldehyde di(epoxyalkyl) acetal and an active organic hardener selected from the group consisting of polycarboxylic acids, polycarboxylic acid anhydrides, polyfunctional amines and polyols.

9. The polymerization product obtained by the polymerization of an epoxycycloalkyl aldehyde di(epoxycycloalkyl) acetal and an active organic hardener selected from the group consisting of polycarboxylic acids, polycarboxylic acid anhydrides, polyfunctional amines and polyols.

10. The polymerization product obtained by the polymerization of an epoxybicycloalkyl aldehyde di(epoxycycloalkyl) acetal and an active organic hardener selected from the group consisting of polycarboxylic acids, polcarboxylic acid anhydrides, polyfunctional amines and polyols.

11. The polymerization product obtained by the polymerization of an epoxyalkyl aldehyde alkenyl epoxyalkyl acetal and an active organic hardener selected from the group consisting of polycarboxylic acids, polycarboxylic acid anhydrides, polyfunctional amines and polyols.

12. The polymerized product obtained by the polymerization of an epoxycycloalkyl aldehyde alkyl alkenyl acetal and a vicinal epoxy polymerization catalyst; said product being characterized by a plurality of pendant ethylenic groups.

13. The polymerized product obtained by the polymerization of an epoxyclcoalkyl aldehyde alkyl alkenyl acetal and a peroxide catalyst, said product being characterized by a plurality of vicinal epoxy groups.

14. The polymerized product obtained by the polymerization of an epoxycycloalkyl aldehyde di(alkenyl) acetal and a vicinal epoxy polymerization catalyst, said product being characterized by a plurality of pendant ethylenic groups.

15. The polymerized product obtained by the polymerization of an epoxycycloalkyl aldehyde di(alkenyl) acetal and a peroxide catalyst, said product being characterized by a plurality of vicinal epoxy groups.

16. The polymerization product obtained by the polymerization of an epoxybicycloalkyl aldehyde alkyl alkenyl acetal and a vicinal epoxy polymerization catalyst, said product being characterized by a plurality of pendant ethylenic groups.

17. The polymerization product obtained by the polymerization of an epoxybicycloalkyl aldehyde alkyl alkenyl acetal and a peroxide catalyst, said product being characterized by a plurality of pendant vicinal epoxy groups.

18. The polymerization product obtained by the polymerization of an epoxybicycloalkyl aldehyde di(alkenyl) acetal and a vicinal epoxy polymerization catalyst, said product being characterized by a plurality of pendant ethylenic groups.

19. The polymerization product obtained by the polymerization of an epoxybicycloalkyl aldehyde di(alkenyl) acetal and a peroxide catalyst, said product being characterized by a plurality of pendant vicinal epoxy groups.

20. The polymerization product obtained by the polymerization of an alkyl aldehyde alkenyl epoxyalkyl acetal and a vicinal epoxy polymerization catalyst, said product being characterized by a plurality of pendant ethylenic groups.

21. The polymerization product obtained by the polymerization of an alkyl aldehyde alkenyl epoxyalkyl acetal and a peroxide catalyst, said product being characterized by a plurality of pendant vicinal epoxy groups.

22. The polymerization product obtained by the polymerization of an alkenyl aldehyde alkenyl epoxyalkyl acetal and a vicinal epoxy polymerization catalyst, said product being characterized by a plurality of pendant ethylenic groups.

23. The polymerization product obtained by the polymerization of an alkenyl aldehyde alkenyl epoxyalkyl acetal and a peroxide catalyst, said product being characterized by a plurality of pendant vicinal epoxy groups.

24. The polymerization product obtained by the polymerization of a carbocyclic aryl aldehyde alkenyl epoxyalkyl acetal and a vicinal epoxy polymerization catalyst, said product being characterized by a plurality of pendant ethylenic groups.

25. The polymerization product obtained by the polymerization of a carbocyclic aryl aldehyde alkenyl epoxyalkyl acetal and a peroxide catalyst, said product being characterized by a plurality of pendant vicinal epoxy groups.

References Cited in the file of this patent

Lee et al.: "Epoxy Resins," McGraw-Hill (New York), 1957.